United States Patent [19]

Klosel

[11] 4,182,063

[45] Jan. 8, 1980

[54] SIGNAL DISPLAY

[76] Inventor: Georg W. Klösel, Falkensteiner Strasse 12, 624 Königstein, Fed. Rep. of Germany

[21] Appl. No.: 750,645

[22] Filed: Dec. 13, 1976

[30] Foreign Application Priority Data

Dec. 12, 1975 [DE] Fed. Rep. of Germany ....... 2555966

[51] Int. Cl.² .............................................. G09F 15/00
[52] U.S. Cl. .................................... 40/610; 40/124.1; 116/63 P
[58] Field of Search ................ 40/126 A, 124.1, 23 A, 40/19, 125 A, 610, 612, 603, 584; 116/63 P

[56] References Cited

U.S. PATENT DOCUMENTS

| 1,128,136 | 2/1915 | Hano | 150/39 |
| 2,690,624 | 10/1954 | Phillips | 40/23 R X |
| 2,768,457 | 10/1956 | Biek | 40/23 R X |
| 3,059,362 | 10/1962 | Scherotto | 40/124.1 |
| 3,203,125 | 8/1965 | Stoessel | 40/124.1 |

Primary Examiner—Louis G. Mancene
Assistant Examiner—Wenceslao J. Contreras
Attorney, Agent, or Firm—Michael J. Striker

[57] ABSTRACT

A sign assembly for motorist comprises an accordion folded sign element with each fold having a given message and which may be folded to expose the desired message with the sign element being mounted within a similar foldable holder so that the sign assembly is foldable as a unit from an inoperative or folded condition to an operative or extended condition and vice versa.

8 Claims, 6 Drawing Figures

SIGNAL DISPLAY

The invention relates to a signalling device.

The announcement of emergencies, in which help by persons is necessary, is usually performed by means of the voice, be it by direct call or over the telephone. If, however, an emergency arises in the motor car traffic, an accoustic announcement is precluded due to the high noise level. Only special vehicles, as for instance ambulances or fire department trucks are permitted by means of special signal devices to overpower the usual accoustic noise level. For the private driver there remains therefore only an optical signallizing. Since there exist a great number of different emergencies, beginning from a sickness of the driver up to damage of the vehicle, it usually is insufficient to announce the emergency only in a general way, but it is necessary to signal the concrete emergency. Only if for instance a passing driver will exactly recognize, what emergency has taken place, he can judge, whether he can help. Correspondingly a device by means of which emergencies should be announced, must permit various optical informations.

A poster book for motor car drivers is already known, which consists of a plurality of signallizing cards connected to a ring binder (DBGM No. 6,806,271). This poster book can in the unfolded condition be pushed into a transparent foil, so that the information on two sides of the book will be visible. In order to present the poster book to passing drivers, it must, however, be held by hand or leaned against the window of an automobile. A free erection before, behind or on an automobile is not possible.

A map or the like with informations for a motor car driver is however also known, which is so constructed, that it can assume a stable position (DBGM No. 7,333,341.2). This map is provided with two stiff covers, which are connected by means of a bridge of plastic material and which may be tilted with respect to each other through about 360°. A pocket of transparent plastic material is connected to the inner side of the cover, in which different signal boards are arranged. These signal boards may contain different informations, "Doctor Urgently Needed" or "Please Tow". If in a serious situation the map is flapped open after opening of a locking means, the the two covers may be turned with respect to each other through about 350° and be arrested by the locking means in this position. Now it is possible to withdraw the eventually desired indicating board of transparent plastic from the pocket and to place the same in front of the other indicating boards in the pocket. In this form the map can be placed in front, at the side or behind the automobile so that it can be seen by any passing motor car driver.

However, the above described map has the disadvantage, that in an emergency a relatively large effort is required to take first the desired information card from the pocket and then replace it again into the pocket. A further disadvantage is that the informations—as in the first-described poster book—point always only in one direction. If it should be desired, that the informations point in two directions, then it would be necessary to provide a second pocket, which would require an increased expense.

It is therefore the object of the invention to create a device for signalling emergencies during a motor car traffic or generally of important events, which may be erected in a stable position in front, behind or on the side of an object, for instance an automobile.

This object is obtained according to the invention by the combination of the following features:

(a) a card folded in an accordian-like manner (Leporello), whereby the surfaces of the card parts are provided with information;

(b) a packaging-and-holding device which has a bottom plate of a size substantially equal to the size of a card part, whereby means are connected to the bottom plate, which hold the folded card on the bottom plate and which also will prevent detachment of the unfolded and in the form of an inverted V erected card from the bottom plate.

In the illustrated embodiment of the invention the means connected with the bottom plate are two transparent foils which are connected to each other or which consist of a single piece of about the size of the bottom plate.

The advantages derived from the invention consist especially, that by the construction of the actual signalling card in form of a Leporello the desired information appears through a simple flapping over of card parts, whereby the arrangement may be made in such a manner that two oppositely arranged card parts carry the same information in order to show this information in two directions, and that the device in a space saving manner for instance in an automobile and to nevertheless obtain a stable announcement of important occurrences.

Further advantages of the invention result from the embodiments shown in the drawing, which in the following will be further described.

Figure 1:
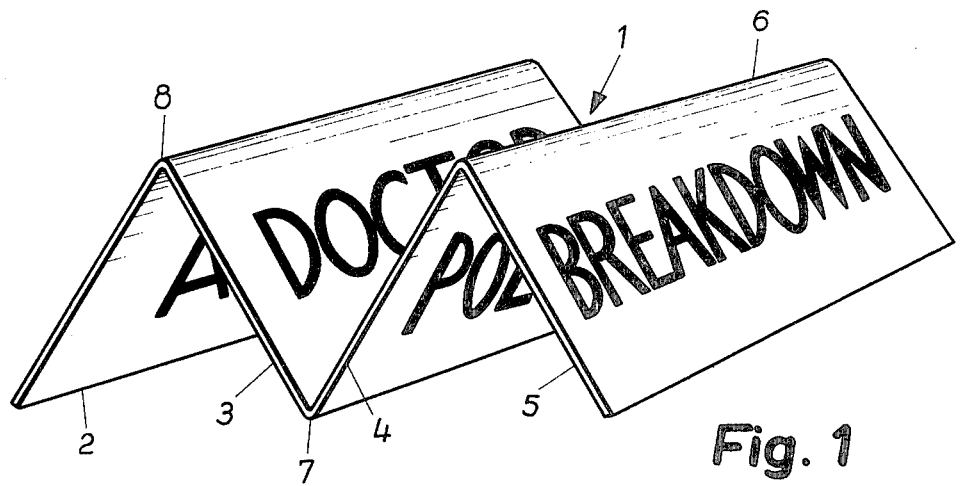
FIG. 1 illustrates an accordian-like folded card in open position.

In FIG. 1 an accordian-like folded card 1 is shown, which comprises a total of four card parts 2,3,4,5. Such a card 1 is sometimes called according to the book of the servant Leporello in Mozarts opera Don Giovani a card with Leporello folds. The folds 6,7,8 can thereby either be made in such a manner, that they will produce preferred foldings or such, that all possibilities of folding the same together can be carried out in equally good manner. Equally good means in this case that the resistance of the folds against bending forces are all equally large, respectively all equally small.

Informations may be placed onto the surfaces of the card parts 2,3,4,5, and respectively on both sides thereof. In an advantageous manner the same informations are respectively provided on two adjacent card parts, so that a reading of this information in two directions is possible. For instance there is written on the side of the card part 5, visible in FIG. 1, the information "MOTOR TROUBLE" as well as on the non-visible side of the card part 4. In a correspondent manner the word "POLICE" is placed on the two opposite sides of the card parts 4 and 5, the beginning of which is visible in FIG. 1 on the card part 4. Other informations as "DOCTOR" or "ABDAC", etc. can be recognized in connection with the card parts 2 and 3.

The card parts 2,3,4,5 of the accordian-like folded card 1 consists in advantageous manner of cardboard covered with plastic material, whereas the folds 5,6,8 consist solely of plastic material. It is however also possible to use other materials, and it is likewise possible to provide instead of the shown four cards 2,3,4,5 more or less cards. Desirabe is only, that the card parts 2,3,4,5 have a certain resistance against bending and are weather-proof, whereas the folds should be elastically bendable and likewise be weather proof. Eventually it is not necessary that the card parts 2,3,4,5 and the folds consist of different materials and this is possible if by the folding procedure the bending resistance of the materials of the card parts 2,3,4,5 is preserved.

Figure 2:
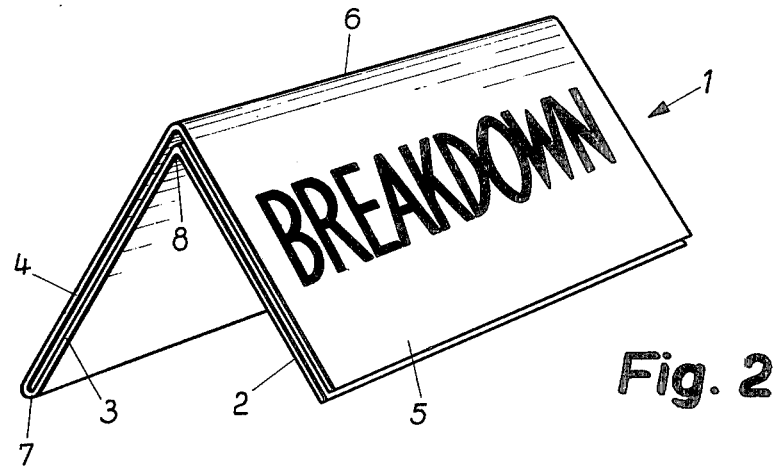
FIG. 2 illustrates an accordian folded card in a signal indicating folded condition.

FIG. 2 illustrates the same card 1 as in FIG. 1, however, in folded condition. The card parts 2,3,4,5 are again visible. Due to the folds 6,7,8 which are yieldable against bending forces, the card 1 usually does not maintain the position as shown in FIG. 2. Therefore it requires a holding device in order to remain in the signalling position of FIG. 2.

Figure 3:
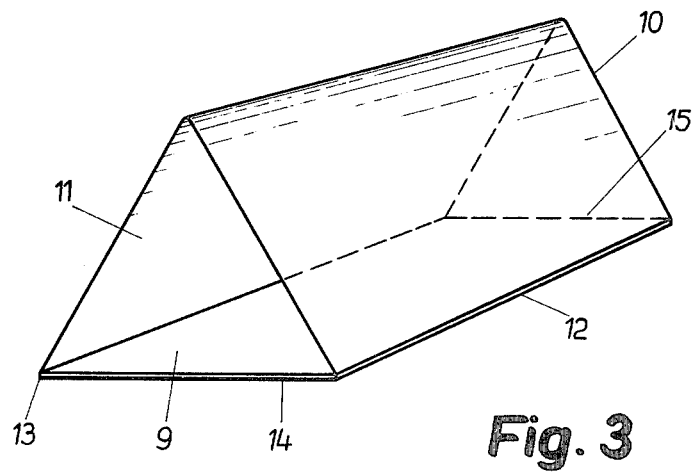
FIG. 3 illustrates a casing in erected condition for an accordian-like folded card.

Such a holding device is shown in FIG. 3. It comprises a bottom plate 9, which for instance consists of the same material as the card parts 2,3,4,5 of the card 1, as well as two transparent foils 10, 11, which can be produced from a single piece. The transparent foils 10, 11 are respectively connected at the two longitudinal edges 12, 13 of the ground plate 9 with the ground plate 9 and form with the lateral edges 14, 15 of the ground plate in erected condition an equilateral or at least a nearly equilateral triangle.

Figure 4:
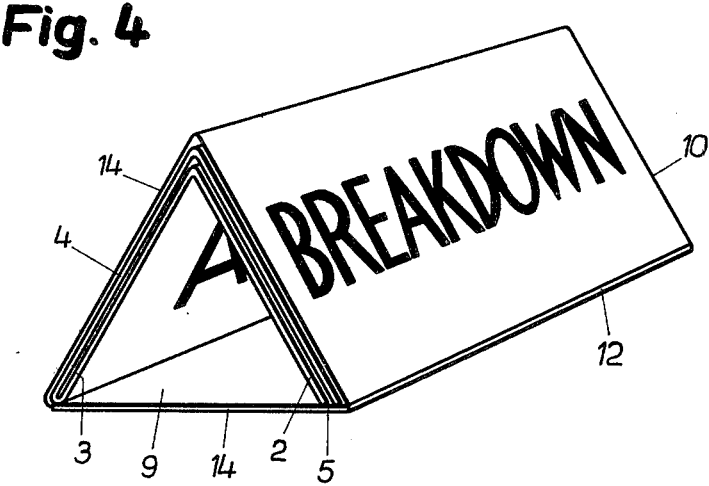
FIG. 4 illustrates a casing according to FIG. 3 with a card according to FIG. 2.

The form of the holding device shown in FIG. 3 is due to the flexibility of the transparent foils 10, 11 usually not stable. However, it becomes stable, when—as shown in FIG. 4—the card 1 of FIG. 2 is pushed between the transparent foils 10, 11. A collapse of the card 1 is now not possible any longer, while the abutments thereof are prevented against lateral movement by the transparent foils 10, 11.

The position shown in FIG. 4 is a so-called signalling position, that is the signalling device can be used to signal any desired information, and be placed in front, behind, laterally or on an object, for instance an automobile.

Figure 5:
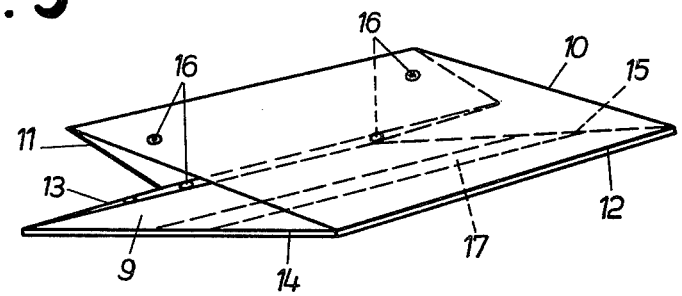
FIG. 5 illustrates the casing according to FIG. 3 in partly folded position.

The holding device shown in FIG. 3 cannot only have the form of a tent, but also the form of a map. This is shown in FIG. 5 in which the transparent foil 11 is folded in the middle and the upper edge of the transparent foil 10 is inclined in the direction toward the edge 13. If the transparent foil 10 is moved still further in the same direction, it will rest parallel to the bottom surface 9, whereas the transparent foil 11 is folded in the middle and the two folded halves will be superimposed.

If snap fastener 16 or any other closing means are provided on the transparent foil 11, then the folded holding device can be closed as a map.

It is also possible to build into the bottom plate 9 a permanent magnet strip 17, by means of which an adhesion of the bottom plate 9 on iron containing parts is possible. In an advantageous manner a piece of the cardboard surrounded by plastic material is thereby removed and the magnet strip inserted in the thus-formed recess. Of course it is also possible to use instead of a magnet strip discrete individual magnets.

Figure 6:
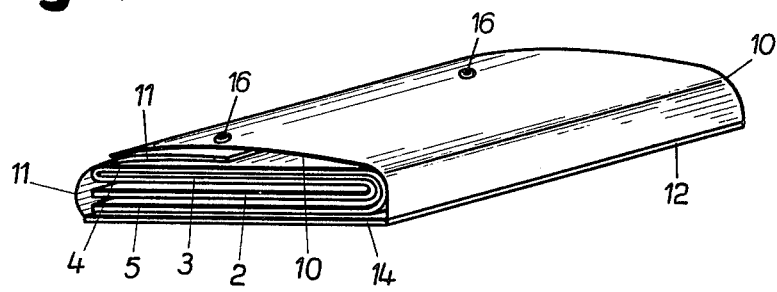
FIG. 6 illustrates a casing according to FIG. 3 with a completely folded card.

FIG. 6 shows a closed map, which however—different than shown in FIG. 5—now contains a fully folded card 1. The edge faces of the card parts 2,3,4,5 of this card 1 can be seen.

The special advantage of the device shown in FIGS. 3 and 5 consists in that the map serves for the transport of an accordian-like folded card as well as erecting means for the same card.

I claim:

1. A signalling device comprising an accordion-like folded card having a number of card parts respectively having surfaces adapted to carry information, said card parts being movable between an inoperative position folded against each other and an operative position in which said card parts are erected in form of an inverted V; and a packing and holding device having a bottom plate having a pair of longitudinal edges and being about the size of a card part and side walls composed of two transparent foils about the size of said bottom plate and each connected along one edge thereof to a respective one of said longitudinal edges of said bottom plate and connected to each other along one edge distant from said bottom plate so that said card parts may be held in said operative position in said packing and holding device in the form of an inverted V; at least one of said transparent foils being bendable about the middle thereof; and fastening means carried by said one foil by means of which one half of the folded foil can be connected to the other half so as to hold said card parts in said inoperative position folded against each other onto said bottom plate.

2. A signalling device as defined in claim 1, wherein said transparent foils are constituted by elastically bendable plastic material.

3. A signalling device as defined in claim 1, wherein said fastening means comprise snap fasteners.

4. A signalling device as defined in claim 1, wherein said fastening means comprise burr-like fastening means.

5. A signalling device as defined in claim 1, wherein said fastening means comprise permanent magnet means.

6. A signalling device as defined in claim 1, and including printed information on the surfaces of said card part.

7. A signalling device as defined in claim 1, wherein said card parts consist of cardboard covered with plastic material.

8. A signalling device as defined in claim 1, wherein said card parts consist of material on which information may be written by a writing impliment and the written information may be easily removed again by wiping means.

* * * * *